(12) United States Patent
Akiho

(10) Patent No.: US 7,025,488 B2
(45) Date of Patent: Apr. 11, 2006

(54) BACKLIGHT FOR LCD'S

(75) Inventor: Mitsuteru Akiho, Nishi-ku (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 250 days.

(21) Appl. No.: 09/932,102

(22) Filed: Aug. 17, 2001

(65) Prior Publication Data

US 2001/0055204 A1 Dec. 27, 2001

Related U.S. Application Data

(63) Continuation of application No. PCT/EP00/12537, filed on Dec. 11, 2000.

(30) Foreign Application Priority Data

Dec. 17, 1999 (JP) ............................................ 11-358680

(51) Int. Cl.
*F21V 8/00* (2006.01)

(52) U.S. Cl. ........................ 362/613; 362/611; 362/561; 362/225

(58) Field of Classification Search .................... 362/31, 362/27, 225, 561, 227
See application file for complete search history.

(56) References Cited

U.S. PATENT DOCUMENTS 5,999,155 A 12/1999 Satou ........................... 345/93

6,181,391 B1 * 1/2001 Okita et al. .................... 349/65
6,390,638 B1 * 5/2002 Miller et al. ................... 362/26
2001/0052955 A1 * 12/2001 Nagatani ....................... 349/65

FOREIGN PATENT DOCUMENTS

| DE | 654318 | * | 4/1998 |
| DE | 29700485 U1 | | 4/1998 |
| EP | 0854318 A1 | | 1/1998 |
| FR | 1.450.285 | | 10/1965 |
| JP | 2-155595 | | 6/1990 |
| WO | 0144715 A1 | | 12/2000 |

* cited by examiner

Primary Examiner—Ali Alavi

(57) ABSTRACT

(Purpose) There is provided with an illumination device for LCD device according to the invention to flow the same electric current through lamps on the same driving voltage, resluting in a long life of said illumination device.

(Means of Solution) The device has a light guide plate 10, three or more light sources 11, 12 and 13 provided around at least one of side ends of the light guide plate 10, and a light reflection member 19, surrounding these light sources, to reflect light emitted from the light sources to the light guide plate 10. The light sources 11, 12 and 13 are located so as to have the same parasitic capacitance caused by intervals between the light sources and the light reflection member 19.

5 Claims, 2 Drawing Sheets

BACKLIGHT FOR LCD'S

This application is a continuation of PCT/EP00/12537 filed on Dec. 11, 2000.

DETAILED DESCRIPTION OF THE INVENTION

1. Technical Field of the Invention

This invention relates to an illumination device for display device and more particularly to an illumination device for a liquid crystal display apparatus, which is referred to a backlight.

2. Prior Art

In a display apparatus such as a transmission LCD, a backlight system is used to illuminate a display surface from a back of an LCD panel. A user can see a display image clearly under the environment which ambient light is dim according to this system.

In a typical manner of such backlight system, there are a both sides lighting type and a one-sided lighting type, and various devices have been devised so as to introduce uniformly light emitted by a light source to an entire screen from the side end(s) of the LCD panel. Such backlight system has been developed in Japanese patent application Laid-open No.9-15595.

The backlight system described in this publication comprises a reflecting mirror for covering these lamps to reflect light emitted from the light source to a light guide section using four elongated lamps as a light source on one side end of the LCD panel. Moreover, these four lamps are arranged such that a distance from the side end of the panel is different each other. So in the arrangement that four lamps are located in the direction of the thickness of the light guide section, it is constituted that a distance to the side end of the light guide section from a first and a third lamps is short, therefore, the distance from the reflecting mirror to the first and the third lamps is long, whereas a distance to the side end of the light guide section from a second and a fourth lamps is long, therefore, the distance from the reflecting mirror to the second and the fourth lamps is short.

Problems to be Solved by the Invention

Such arrangement manner makes a parasitic capacitance (a floating capacitance) of each of lamp caused by a lamp operation environment, specifically, a different gap from the reflecting mirror. According to this constitution, even if the same driving voltage is supplied to each lamp, an amount of current flow of one lamp becomes higher than the amount of current flow of the other lamp, so that different life times of the lamps may be occurred.

The life time of the lamp depends on the amount of current flow through the lamp, and it can be said that the life time of a lamp is short in case that excessive current has been fed to the lamp. Moreover, since the life time of the backlight system would be determined by the shortest lamp life time of the lamps used therein, it is important to realize the same life time of the lamps by constituting such that current can not be fed excessively and the same amount of current should be fed to each lamp under the same driving voltage.

The object of the invention is to provide a display apparatus illumination device which the same current can be fed to the lamp or the like under the same driving voltage, thereby to be able to contribute to a longer life time of the lamp.

[Means for Solving the Problems]

To this end, an illumination device for display device according to the invention comprises a light guide plate, three or more light sources provided around at least one of side ends of the light guide plate, and a light reflection member, surrounding said light sources, that reflects light emitted from said light sources to said light guide plate, wherein said light sources are provided so as to have the same parasitic capacitance caused by intervals or gaps between said light sources and said light reflection member.

Since light sources or lamps are arranged as described above, the same amount of current can feed through the lamps when supplying the same driving voltage to each lamp. Moreover, an excessive lamp current can be avoided by unifying the parasitic capacitance of the lamp, whereby the life time of the lamp can be extended and can contribute to a longer life time of products in its turn.

In the illumination device of the described-above manner, at least one of said light sources positioned at the center is closer to an end of said light reflection member farthest from said light guide plate than the other light sources. Because of this constitution, the parasitic capacitance of the lamps can be made equal effectively.

Moreover, the light reflection member has an opening faced to the side end of the light guide plate, and wherein the light sources are accommodated inside said light reflection member so as to emit light from the opening to the light guide plate. So a light reflecting function and a light source accommodating said function can be constituted by the same member.

Moreover, the light guide plate is provided on a rear surface side of a display panel of a transmission liquid crystal display device, and has a light reflection layer on a surface on the opposite side to the liquid crystal display device. So it can be applied as the backlight of the transmitting-type liquid crystal display apparatus.

Furthermore, the light sources are elongated lamps provided in approximately parallel to each other along the side end of the light guide plate.

Embodiment of the Invention

FIG. 1 schematically shows a part of a backlight system for the transmitting-type liquid crystal display apparatus as an illumination device according to one embodiment of the invention.

In FIG. 1, this backlight system 1 comprises a light guide plate 10 arranged on the rear surface side of a transmission type LCD panel 2, a light reflecting plate (a layer) 1R arranged on the rear surface of this light guide plate 10, three pieces of lamp 11, 12 and 13 arranged at the vicinity of the side of the light guide plate 10, and a reflector 19 surrounding these lamps wholly and having a light-reflecting surface on the inside surface.

The LCD panel 2 comprises two transparent substrates sandwiching and holding an enclosed liquid crystal therebetween, a matrix of thin film transistors connected with a pixel electrode and formed on one of the substrate, common electrodes and color filter layers formed on the other of the substrates, and optical films. The light emitted from the lamp is entered into the light guide plate 10 directly, or after being reflected by a reflector 19, and to be subjected to a light diffusion action in the light guide plate 10 together with further a reflex action by a light reflection plate IR, and then to be led to the LCD panel 2.

The first, second, and third lamps 11, 12 and 13 are the elongated lamps extended in the direction perpendicular to a paper of the drawing respectively, and for example, a fluorescent lamp tubes such as cold cathode discharge tubes, or hot-cathode discharge tubes are applied. Although such lamps are arranged along the side of the light guide plate 10 and in parallel each other, only the second lamp 12 at the central is arranged closer to the reflector 19.

More particularly, the lamp of the first or the third is arranged such that the parasitic capacitance (floating capacitance) of the lamps caused by the gap of the lamp and the reflector 19 become equal each other. The inventor has recognized that at least one lamp at the central is kept away from the side of the panel than other lamps and is arranged closer to the reflector 19b, whereby the parasitic capacitances can be equalized effectively.

For the first lamp 11 at one side, a total parasitic capacitance C1 may contain a parasitic capacitance C1a formed in the gap between the first surface 19a of the reflector 19 and the lamp 11 and a parasitic capacitance C1b formed in the gap between the second surface 19b thereof and the lamp 11, in the case of this embodiment that the reflector 19 is a rectangle. Moreover, for the second lamp 12 at the central, a total parasitic capacitance C2 may contain a parasitic capacitance C2a formed in the gap between the first surface 19a and the lamp 12, a parasitic capacitance C2b formed in the gap between the second surface 19b and the lamp 12, and a parasitic capacitance C2c formed in the gap between the third surface 19c and the lamp 12. For the third lamp 13, a total parasitic capacitance C3 may contain a parasitic capacitance C3b formed in the gap between the second surface 19b and the lamp 13, and a parasitic capacitance C3c formed in the gap between the third surface 19c and the lamp 13.

The same current can be fed through all lamps by the above-mentioned arrangement of the lamps when driving each lamp with the same voltage. When the reflector 19 has a symmetric cross-section shape with respect to a central line "q", the arrangement of the lamp also may be symmetric, whereby the arrangement becomes easy. Moreover, the unbalanced parasitic capacitance can be reduced by the arrangement, whereby the life time of the lamp can be longer, and the life time of the display devices can be longer.

On the other hand, when the reflector is not a rectangle in the cross section view, but is an approximately half-round in FIG. 2, the arrangement of the lamp may be determined for the same parasitic capacitance of the lamps by considering the parasitic capacitance of each lamp with respect to the entire region of the reflecting surface of the reflector 19'. In this case, it is also effective that the lamp 12 at the central is closer to a portion of the reflector 19' which portion is farthest from the light guide 10.

FIG. 3 schematically shows a part of a backlight system for the transmitting-type liquid crystal display apparatus as an illumination device in the further embodiment of the invention.

In FIG. 3, the same reference symbols are referred to the same portions as FIG. 1. This backlight system 1 has four lamps, but the arrangement may be considered in a similar way. That is, the second and the third lamps 12 and 13 at the central are closer to a portion of the reflector 19 which portion is farthest from the light guide 10.

According to this constitution, the parasitic capacitance of four lamps can be equalized effectively, and the same effect as the constitution of FIG. 1 may be obtained. Moreover, even though the reflector is of a half-round shape in the cross section as shown in FIG. 4, the similar effect can be obtained in a similar way.

Although only the three and four lamps are explained in the embodiments, the parasitic capacitances can be equalized effectively in the same way also for more lamps. In lamps of the cold cathode discharge tubes in particular, since the inverter circuit for driving the lamps is easily designed and may be advantageous for size reduction. The luminance control is also easy. Since luminance is low as compared with a lamp of the hot-cathode discharge tube, high luminance may be obtained by using many lamps. In such case, the illumination device according to this invention is very suitable.

Moreover, although a rectangle and a half-round shapes have been described in the embodiments, a parabolic shape or a trapezoid shape, for example, may be applicable. Regardless of the cross-section shape of the reflector, the same effect can be obtained by the arrangement for the same parasitic capacitance of all lamps in case of the backlight system using three or more lamps.

Moreover, although the LCD apparatus has been described in the embodiments, the invention should not be limited to the LCD apparatus. This invention is applicable for other kind of display apparatus using the illumination device.

Furthermore, although the backlight system of the transmitting-type LCD apparatus with an active matrix type using thin film transistors has been described in the embodiments, the invention is also applicable for an apparatus with a simple matrix type, and it is also applicable for the illumination system as a subsidiary illumination in a reflective type of LCD apparatus. A light reflective plate 1R described in the embodiment may be changed in such illumination system.

Effects of the Invention

According to the invention, the same amount of lamp current can be fed when applying the same driving voltage to each light source. Therefore, an approximately uniform luminance can be obtained for each lamp. Moreover, by equalizing a parasitic capacitance of a lamp, an excessive lamp current can be prevented and a life time of a lamp is longer so that the longer life time of products can be realized.

DESCRIPTION OF REFERENCE NUMERALS

Figure 1:
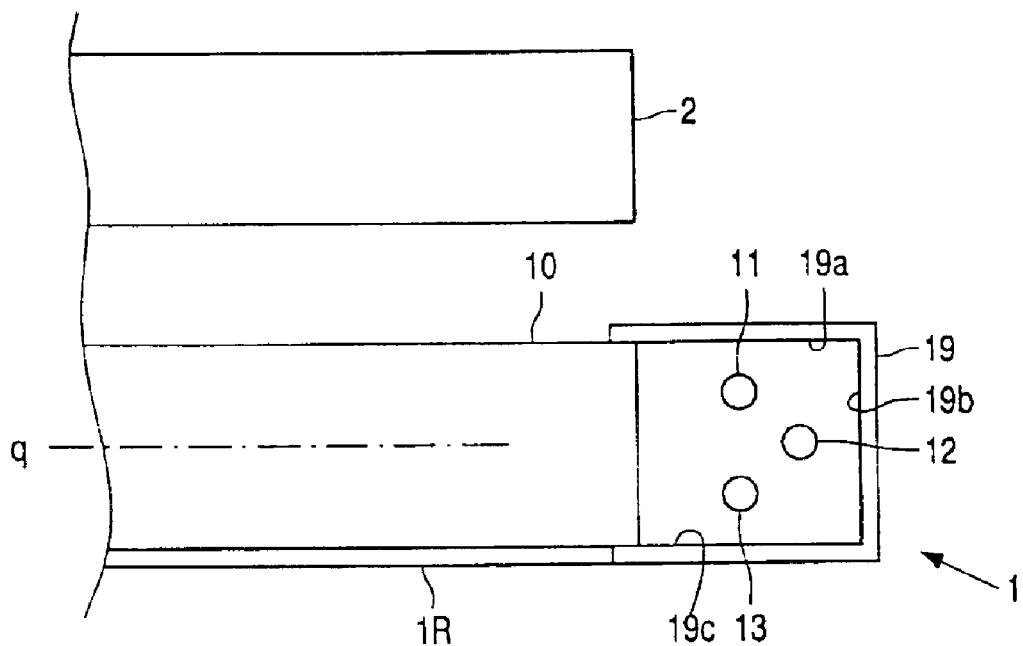
FIG. 1 diagramatically shows a partial section view for a backlight system as an illumination device according to the invention.
Figure 2:
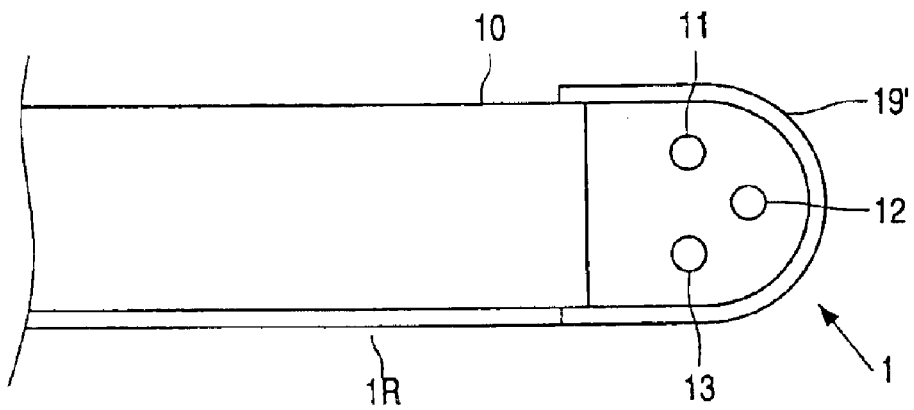
FIG. 2 shows a section view for a further embodiment of the backlight system.
Figure 3:
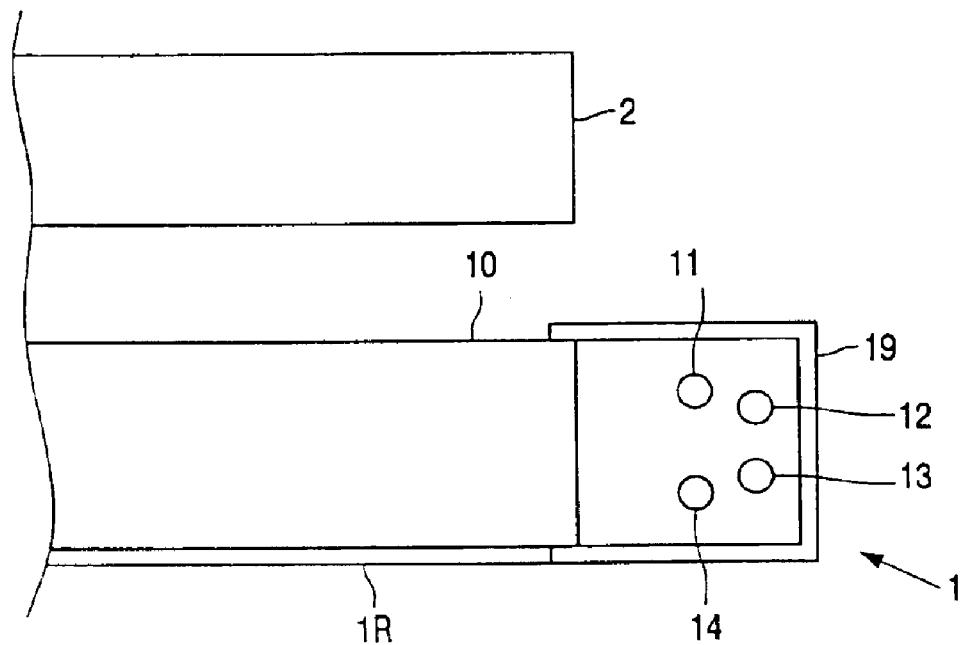
FIG. 3 shows a partial section view for a further backlight system as an illumination device according to the invention.
Figure 4:
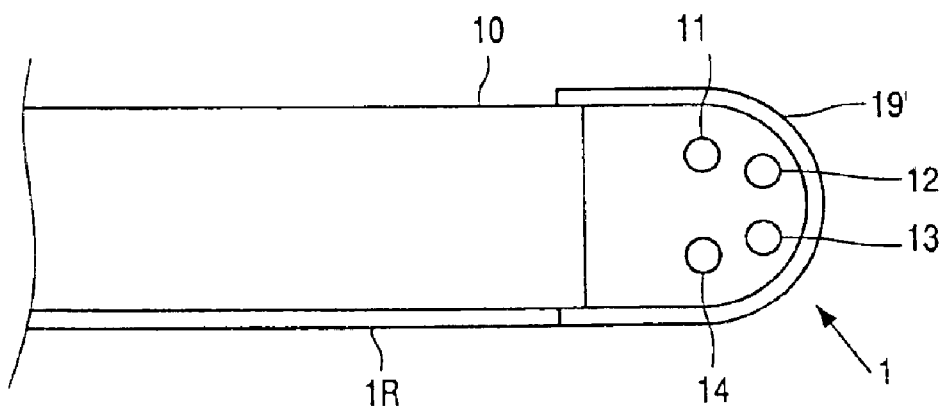
FIG. 4 shows a section view for a further backlight system.

1 . . . backlight system
10 . . . light guide plate
1R . . . light reflection plate
11–14 . . . lamp
19, 19 . . . reflector
19a–19c . . . first to third surfaces
2 . . . LCD

What is claimed is:

1. An illumination device for display device, comprising a light guide plate, three or more light sources provided at at least one of the side ends of the light guide plate, and a light reflection member, surrounding said light sources, that reflects light emitted from said light sources to said light guide plate,
 wherein said light sources are located relative to each other and to the light reflection member so as to have the same parasitic capacitance caused by intervals between said light sources and said light reflection member.

2. The illumination device for display as claimed in claim 1, wherein at least one of said light sources positioned at the center is closer to an end of said light reflection member farthest from said light guide plate than the other light sources.

3. The illumination device for display device as claimed in claim 1, wherein said light reflection member has an opening faced to said side end of said light guide plate, and wherein said light sources are accommodated inside said light reflection member so as to emit light from said opening to said light guide plate.

4. The illumination device for display device as claimed in claim 1, wherein said light guide plate is provided on a rear surface side of a display panel of a transmission liquid crystal display device, and has a light reflection layer on a surface on the opposite side to said liquid crystal display device.

5. The illumination device for display device as claimed in claim 1, wherein said light sources are elongated lamps provided in approximately parallel to each other along the side end of said light guide plate.

* * * * *